Figure 1:
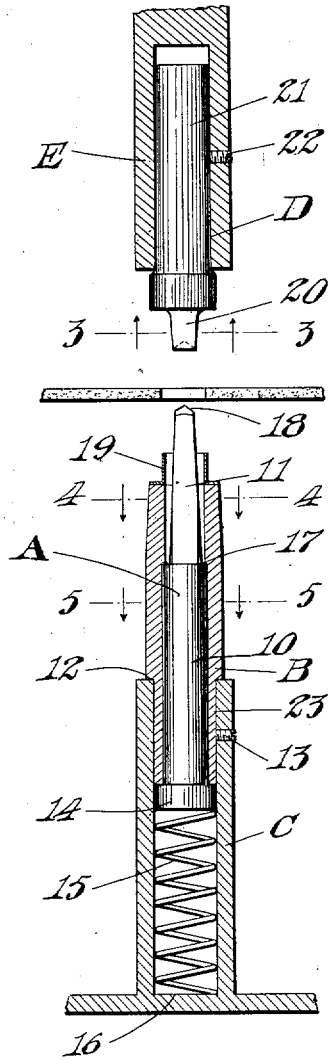

W. HUGHES.

EYELET SETTING MACHINE.

APPLICATION FILED OCT. 19, 1912.

Reissued Feb. 3, 1914. 13,683.

WITNESSES.

Helen M. Purcell

John H. Parker

INVENTOR.

William Hughes by Macleod, Calver, Copeland & Dike attorneys.

COLUMBIA PLANOGRAPH CO., WASHINGTON, D. C.

UNITED STATES PATENT OFFICE.

WILLIAM HUGHES, OF TAUNTON, MASSACHUSETTS.

EYELET-SETTING MACHINE.

13,683. Specification of Reissued Letters Patent. Reissued Feb. 3, 1914.

Original No. 1,008,036, dated November 7, 1911, Serial No. 539,969. Application for reissue filed October 19, 1912. Serial No. 726,849.

*To all whom it may concern:*

Be it known that I, WILLIAM HUGHES, a citizen of the United States, residing at Taunton, in the county of Bristol, State of Massachusetts, have invented a certain new and useful Improvement in Eyelet-Setting Machines, of which the following is a specification, reference being had therein to the accompanying drawings.

In machines for setting eyelets there is usually provided a raceway through which the eyelets are fed into position to be picked off by a spindle connected with said mechanism, said spindle having a vertically reciprocable movement through a hollow fixed cylinder, termed the under set, the upper end of said cylinder forming an anvil upon which the flange of the eyelet rests when the spindle moves downward after having picked the eyelet from the raceway and there is also provided a vertically reciprocable plunger, termed the top set, which moves down as said spindle moves down and engages in the barrel of the eyelet after the eyelet has been inserted in the work, the work being fed on a work plate through which the spindle reciprocates. Heretofore the spindle used has been circular in cross-section and the bore in the under set in which the plunger reciprocates has been circular in cross-section. When the eyelets pass down through the raceway, means are usually provided whereby they will all be fed in an upright position so that the spindle can easily pick them from the raceway but although they ride down the raceway on end, there is nothing to prevent them from turning or rotating on their axes. When the eyelets which are employed are formed with a tubular barrel, circular in cross-section, it does not matter if the eyelets do turn on their axes as long as they are retained on end and it does not matter if they should rotate on the spindle after the spindle has picked them from the raceway because they are alike on all sides. But when eyelets are used having a barrel which is rectangular in cross-section or otherwise non-circular it is important when the eyelets are to be set in a row, as for instance, when they are being set in the upper of a shoe, that the corresponding sides of the barrel should lie in the same direction, that is, if the barrel is square, one of the straight sides of the inner periphery should lie parallel with the edge of the opening in the shoe. Or if it be desired to set the eyelets in such manner that the straight edge of the inner periphery shall be at an angle to the edge of the opening in the shoe, then all of the eyelets in the series should be set at the same angle. When the spindle is circular in cross-section as heretofore used, an eyelet even with a square opening can rotate thereon, so that although the spindle may successfully pick the eyelets from the raceway, yet there is no certainty at all that the eyelets will be properly alined with each other so as to make sure that the straight edges will be in proper line.

The object of the present invention is to so construct the mechanism that when eyelets are employed whose eyes are non-circular in cross-section whatever may be their position on their axes when picked from the raceway by the spindle they will be properly centered and alined before they are set.

The invention consists substantially in having the plunger or spindle and the follower or upper set both formed with a non-circular cross-section corresponding with the non-circular cross-sectional contour of the inner periphery of the eyelet and having the hollow cylinder or under set through which the plunger or spindle reciprocates formed with the upper portion at least of its bore of a similar non-circular cross-section, the non-circular upper portion of the spindle terminating in a taper.

The invention will be fully understood from the following description taken in connection with the accompanying drawings, and the novel features will be pointed out and clearly defined in the claims at the close of the specification.

Figure 2:
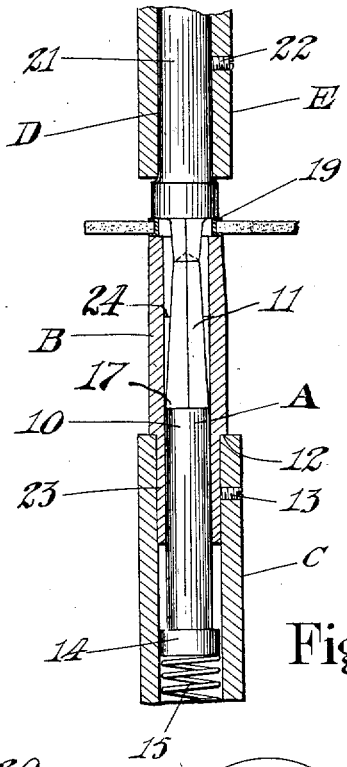
Figure 3:
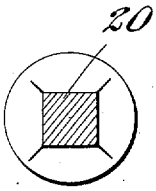
Figure 6:
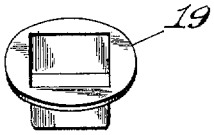
Figure 5:
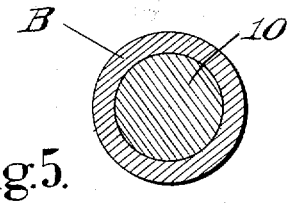
Figure 4:
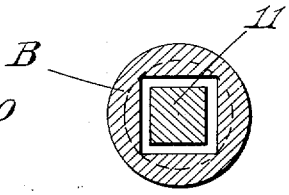

In the drawings,—Figure 1 is a side elevation partly in section of the upper and under sets of an eyelet setting machine and the mounts for the sets embodying the invention showing the parts with the upper set or follower raised and with an eyelet resting upon the under set or cylinder and a spindle extending up through the cylinder as will be the case after the eyelet has been picked from the raceway. Fig. 2 is a similar view to Fig. 1 showing the parts in the position after the upper set or follower has descended to set the eyelet and the spindle has descended out of the way. Fig. 3 is a section on line 3—3 of Fig. 1 looking upward. Fig. 4 is a section on line 4—4 of Fig. 1 looking downward. Fig. 5 is a section on line 5—5 of Fig. 1 looking downward. Fig. 6 is a perspective view enlarged of one of the eyelets.

Referring now to the drawings:—The spindle A is formed with a cylindrical lower portion 10 and an upper portion 11 formed square in cross-section tapering upward, and forming a shoulder 17, said spindle being vertically slidable in the hollow under set B which serves as a bearing as well as an anvil for the eyelet. The cylindrical lower portion 10 of the spindle has a close sliding fit in the cylindrical interior bore of the cylindrical under set B. The interior periphery of the under set B is formed with a shoulder 24. The greatest diameter of the square portion 11 is no greater than the diameter of the cylindrical portion 10. The lower portion 23 of the under set B is made of reduced exterior diameter forming a shank which is fitted into the upper end of the cylindrical tubular mount C, the diminished diameter of the cylinder which forms the shank portion 23 resulting in the formation of a shoulder 12 which rests on the upper end of the mount C. A set screw 13 passing through the side of the mount C securely binds the tubular under set B to the mount C.

The lower end of the spindle A is formed with a head 14 which is seated upon a spring 15, said spring being seated upon the bottom 16 of the tubular mount C. The head 14 is slidable within the tubular interior of the mount C and is normally held by the spring 15 with a yielding pressure against the lower end of the tubular under set B, forming a stop which limits the upward movement of the spindle. When pressure is brought upon the upper end of the spindle A, the spindle will be depressed, thereby contracting the spring 15. When the downward pressure upon the spindle is released the spring 15 will carry the spindle up again until the head 14 strikes the lower end of the under set B. By loosening the set screw 13, the cylindrical under set B may be turned in its bearing in the cylinder C and adjusted to any position on its axis. The upper portion of the interior bore of the under set B, for instance as shown in the drawings the portion of the bore above the shoulder 17, is made square in cross-section corresponding with the largest cross-section of the square portion 11 of the spindle so that the spindle can slide in the hollow under set but not turn therein until the spindle is moved down to a point where the greatest diameter of the square portion of the spindle is less than the smallest diameter of the bore at that point. The largest square section of the spindle is small enough to be inclosed in a circle corresponding with the circular cross-section of the cylindrical portion of the spindle. By loosening the screw 13 as previously described, the spindle may be set to turn its square sides to adjust it as desired.

The square portion 11 of the spindle is formed with an upwardly diminishing diameter and terminates in a pointed portion 18. When the eyelet as 19, is picked from the raceway by the spindle the pointed upper end of the spindle will enter the barrel of the eyelet. The upper part of the square portion of the spindle will be smaller in diameter than the interior diameter of the eyelet and whatever may be the position of the eyelet on its axis when it is first picked from the raceway by the pointed end of the spindle, the eyelet will swing around as it slides down over the spindle until its square edges are parallel with the square edges of the spindle, so that every eyelet, no matter what position on its axis it occupies when it is picked from the raceway, will be centered by the spindle before the plunger descends.

The plunger or follower D is formed with a tapering lower end 20, square in cross-section as shown in Fig. 3 and is formed with a cylindrical shank 21 which is adjustably mounted in a tubular head E and secured therein by a set screw 22, said plunger being adjustable on its axis so that the flat faces of the square lower portion 20 may be adjusted to correspond with the square faces of the spindle A so that after the eyelet has been picked off by the spindle and properly centered upon the upper end of the under set B the lower end of the plunger will be properly alined with the square eye of the eyelet.

What I claim is:

1. In a machine for setting eyelets, an under set comprising a vertically reciprocable spindle having its upper portion non-cylindrical and tapered, a hollow member in which said spindle reciprocates, the portion of the bore of said hollow member within which the non-cylindrical portion of the spindle reciprocates being non-circular in cross-section corresponding in contour with the non-cylindrical portion of the spindle.

2. In a machine for setting eyelets, an under set comprising a tubular mount, a tubular sleeve having a tubular shank portion fitted into the upper end of said tubular mount and made fast thereto, said tubular sleeve having the lower portion of its inner periphery cylindrical and its upper portion non-cylindrical in cross-section, a spring seated in the lower part of said tubular mount, a spindle having a flanged lower end seated upon said spring and adapted to engage the lower end of said tubular sleeve as a stop to limit the upward movement of said spindle, said spindle having a cylindrical portion above the flanged lower end which has a sliding fit in the cylindrical portion of the bore of said sleeve and a non-cylindrical tapered upper portion whose largest diameter is no greater than the diameter of the cylindrical portion, the non-cylindrical portion of the spindle at its largest diameter having a sliding fit with the non-cylindrical portion of the bore of said sleeve.

3. In a machine for setting eyelets, an under set comprising a tubular non-rotatable mount, a tubular sleeve having a tubular shank portion fitted into the upper end of said tubular mount and made fast thereto, said tubular sleeve having the lower portion of its inner periphery cylindrical and its upper portion non-cylindrical in cross-section, a spring seated in the lower part of said tubular mount, a spindle seated upon said spring, a stop to limit the upward movement of said spindle, said spindle having a cylindrical portion which has a sliding fit in the cylindrical portion of the bore of said sleeve and a non-cylindrical tapered upper portion whose largest diameter is no greater than the diameter of the cylindrical portion, the non-cylindrical portion of the spindle at its largest diameter having a sliding fit with the non-cylindrical portion of the bore of said sleeve.

4. In a machine for setting eyelets, an under set comprising a vertically reciprocable spindle having its lower portion cylindrical and its upper portion tapered and non-cylindrical, a hollow member in which said spindle reciprocates, the lower portion of the bore of said hollow member being circular in cross-section and the upper portion of the bore of said member being non-circular in cross-section corresponding in contour with the non-cylindrical portion of the spindle, said non-cylindrical portion being shaped in cross-sectional contour to correspond with the contour of the inner periphery of the barrel of the eyelets which are to be set.

5. In a machine for setting eyelets, an under set comprising a vertically reciprocable spindle having its lower portion cylindrical and its upper portion non-cylindrical and tapered, a hollow member in which said spindle reciprocates, the lower portion of the bore of said hollow member being circular in cross-section and the upper portion of the bore of said member being non-circular in cross-section corresponding in contour with the non-cylindrical portion of the spindle, the greatest diameter of the non-circular portion of the spindle being no greater than the diameter of the cylindrical portion of the spindle, the non-cylindrical portion of the spindle having its diameter so proportioned to the diameter of the non-circular part of the bore for a portion of its length that the spindle cannot turn in its bearings in the hollow member until it has descended to a point where its greatest diameter is less than the smallest diameter of the bore at that point.

6. In a machine for setting eyelets, an under set comprising a vertically reciprocable spindle having its lower portion cylindrical and its upper portion square, a hollow member in which said spindle reciprocates, the lower portion of the bore of said hollow member being circular in cross-section and the upper portion of the bore of said member being square in cross-section corresponding in contour with the square portion of the spindle.

7. An eyelet setting machine for square eyed eyelets having a lower set formed with an eyelet supporting surface, an upwardly tapered spindle mounted within the lower set, said tapered portion being square in cross section and of less diameter than the dimension of the eye of the eyelet so that the eyelets will be centered by the spindle irrespective of their position on their axes when picked from the raceway, and an upsetting die having a clenching surface which merges downwardly into a square central projection arranged in line with the spindle of the lower set.

In testimony whereof I affix my signature, in presence of two witnesses.

WILLIAM HUGHES.

Witnesses:
WILLIAM A. MACLEOD,
ALICE H. MORRISON.

Copies of this patent may be obtained for five cents each, by addressing the "Commissioner of Patents, Washington, D. C."